No. 689,508. Patented Dec. 24, 1901.
S. T. McKNIGHT.
COTTON SEED PLANTER.
(Application filed Aug. 23, 1901.)
(No Model.) 3 Sheets—Sheet 1.
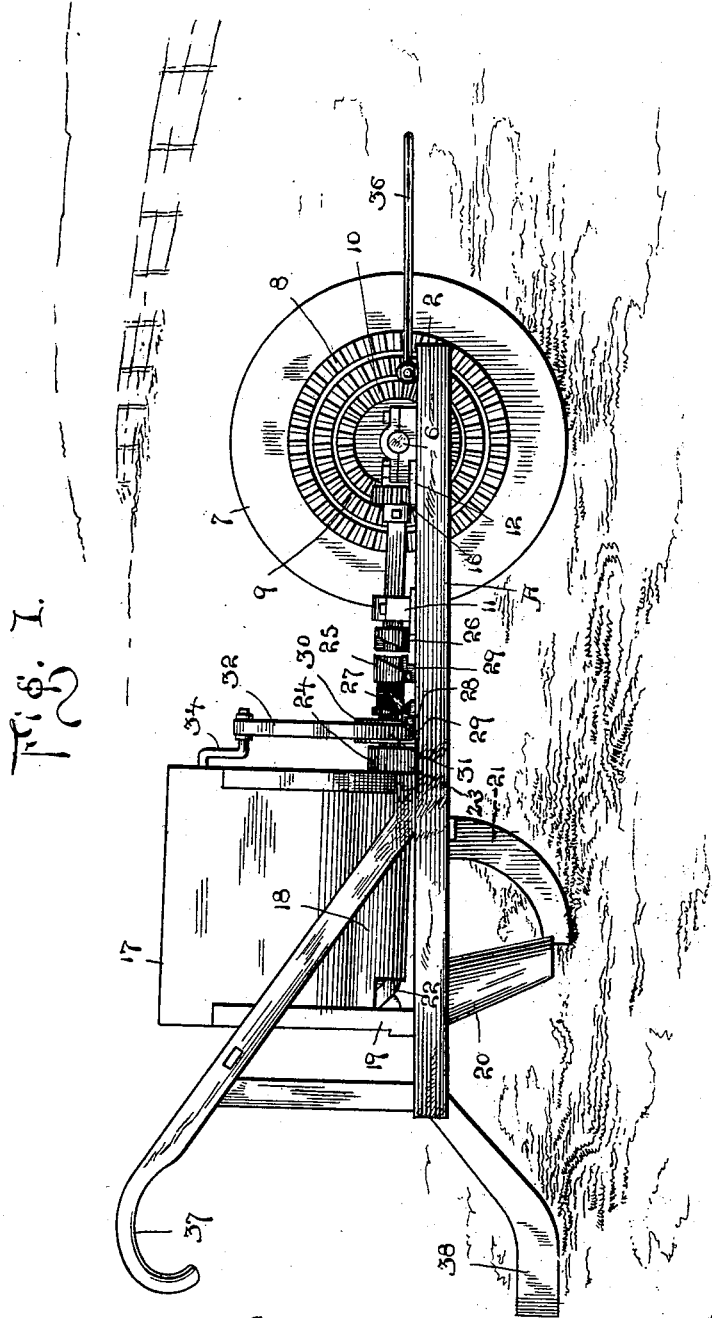
Inventor
Squire Timothy McKnight,
Attorney

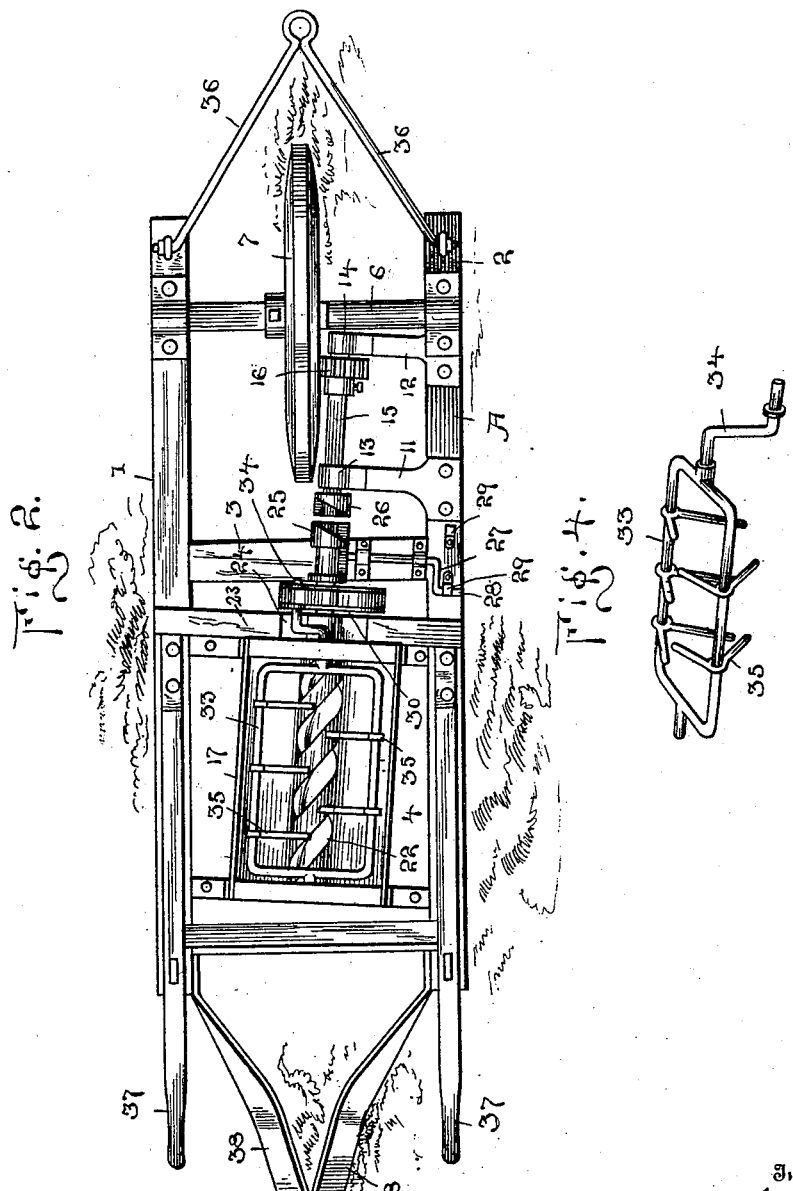

No. 689,508. Patented Dec. 24, 1901.
S. T. McKNIGHT.
COTTON SEED PLANTER.
(Application filed Aug. 23, 1901.)

(No Model.) 3 Sheets—Sheet 3.

Witnesses
Inventor
Squire Timothy McKnight,
By Victor J. Evans
Attorney

UNITED STATES PATENT OFFICE.

SQUIRE TIMOTHY McKNIGHT, OF MINGO, MISSOURI.

COTTON-SEED PLANTER.

SPECIFICATION forming part of Letters Patent No. 689,508, dated December 24, 1901.

Application filed August 23, 1901. Serial No. 73,081. (No model.)

*To all whom it may concern:*

Be it known that I, SQUIRE TIMOTHY MC-KNIGHT, a citizen of the United States, residing at and whose post-office address is Mingo, in the county of Stoddard and State of Missouri, have invented new and useful Improvements in Cotton-Seed Planters, of which the following is a specification.

My invention relates to improvements in cotton-seed planters; and the object is to provide a mechanism to accomplish the purpose which is simple in construction and efficient and reliable in operation.

The invention consists in the novel construction of parts and their operative combination or aggroupment, as will be hereinafter fully specified and particularly pointed out and distinctly claimed.

I have fully and clearly illustrated the invention in the accompanying drawings, forming a part of this specification, and wherein—

Figure 5:
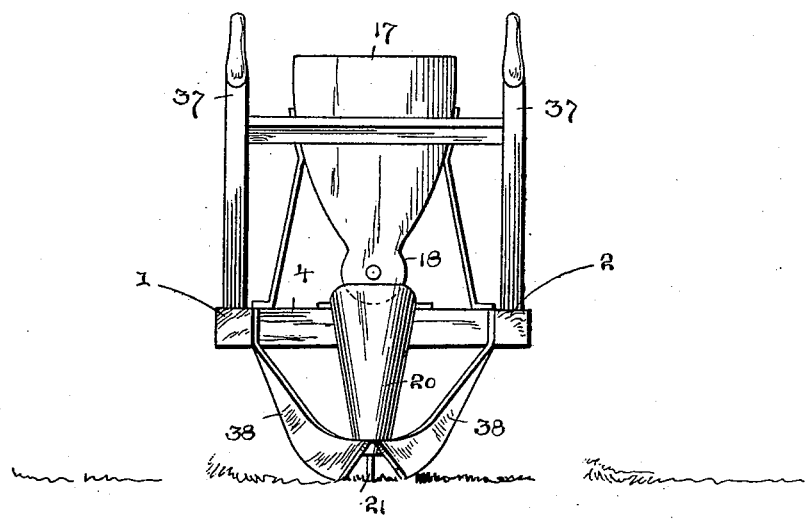
Figure 3:
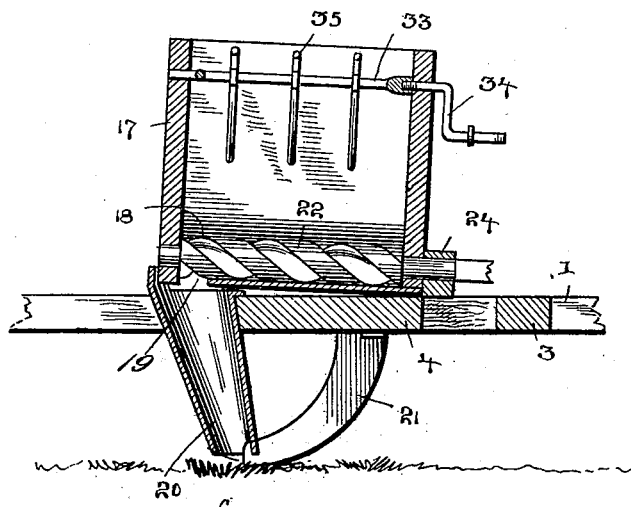

Figure 1 is a side view of my improved cotton-seed planter. Fig. 2 is a plan view thereof. Fig. 3 is a vertical central longitudinal section through the seed-hopper, showing the feed-screw and the stirrer. Fig. 4 is a detail view of the stirrer-frame and stirrers removed from the hopper. Fig. 5 is a rear view in elevation, showing the seed-conductor and the coverers.

Referring to the drawings, A designates the frame on which the operating mechanism is mounted. This frame may be of any suitable construction applicable to serve the purpose. I have illustrated it as consisting of substantial parallel side rails 1 2, connected by a cross-piece 3 and provided with a floor 4, on which the seed-hopper is mounted and supported. At the front end of the frame is journaled an axle 6, on which is mounted a wheel 7, adapted to travel in or mark the furrow or row in which the seeds are deposited. To serve the purpose with more certainty, the side faces of this wheel may be tapered adjacent to the perimeter, as indicated in the drawings, which will permit the wheel to make a deeper furrow than if broader on its circumferential edge. The wheel 7 has formed on or secured to one of its faces three circular rows of gears 8, 9, and 10, arranged concentric to the axle of the wheel and to each other, in order that by the adjustment of the pinion or gear on the seed-shaft the speed of the shaft may be made greater or less. Secured to and projecting inward from one of the side rails of the frame are two arms 11 12, provided with bearings 13 14 at their inner ends, in which is journaled a shaft 15, so mounted as to be restrained against endwise displacement. The body of the shaft 15 is made angular and has adjustably mounted thereon a pinion or gear wheel 16, adjustable along the shaft, so as to bring it in engagement with a selected face-gear on the wheel 7, as heretofore specified. On the floor of the frame is mounted a seed-hopper 17, having inwardly-inclined sides and vertical ends, and in the bottom is formed a longitudinally-arranged recess 18, circular in cross-section, and constitutes a passage in which the seed worm or screw rotates, and at the rear end of this passage is the seed-opening 19, which opens into the seed-spout 20, which feeds the seeds to the ground. Fixed to the bottom of the floor, adjacent to the front end thereof, is a furrow-opener 21, which is curved backward, as shown, and has its lower end secured to the lower end of the seed-spout 20, serving not only as a furrow-opener, but also acting as a clearer to remove obstacles from the path of the spout. In the bottom of the hopper is journaled a screw 22, having the pitch of the screw made to carry the seed into the mouth of the seed-spout. The depth of thread of this screw is such that it carries the requisite supply of seeds regularly into the seed-spout. Secured across the frame immediately adjacent to the front end of the hopper is a bar 23, in which is formed a bearing 24, wherein the front of the screw-shaft is journaled. This shaft extends a proper distance forward and carries on its end the sliding member 25 of a clutch, the other member 26 of the clutch being mounted on the inner end of the shaft 15. The clutch is thrown into and out of engagement by means of a clutch-lever 27, journaled on the frame and engaging in an annular way in the sliding member of the clutch. This clutch-lever is provided with a crank-arm 28, which locks behind a keeper 29, substantially as indicated.

On the screw-shaft is mounted an eccentric 30, provided with a strap 31, which is extended vertically, as at 32, forming an arm having an aperture for the crank-arm of the agitating-frame in the hopper.

In the hopper is journaled a rectangular frame 33, having a crank-arm 34, extending outside of the end of the hopper and pivotally engaging in the aperture in the upper end of the eccentric-arm 32. On the side bars of the frame 33 are hung a plurality of depending seed-stirrers 35, which reach down into the seeds in the hopper and by their action keep them from becoming packed and always in condition to be fed to the action of the screw. This agitation is effected through the medium of the eccentric-arm, which imparts to the frame in the hopper a rocking motion.

To the front end of the frame is secured the draw-bar 36, to which the animal is hitched to pull the machine.

The machine is provided with handles 37 at the rear, and covering-blades 38 are suitably secured to the rear of the frame and arranged to cover the seeds in the furrow in a well-known manner.

The operation of the machine is as follows: The machine having been supplied with seed and the clutch thrown into engagement, then when the machine is put into motion the front wheel marks and opens the furrow, the screw feeds the seeds to the seed-spout, which delivers them to the furrow, and covering-blades cover them with soil. In the progress of the machine the agitators in the hopper keep the seeds loose and free for the action of the screw.

What I claim is—

1. In a cotton-seed planter, the combination with a seed-hopper, of a seed-feeder rotatably mounted in the bottom of the hopper having its shaft extended frontward outside the hopper, an eccentric mounted on the shaft, a strap on the eccentric having a vertically-extending arm, a seed-agitator pivotally mounted in the hopper, and provided with a crank-arm connected to the arm of the eccentric-strap.

2. A cotton-seed planter, comprising a wheeled supporting-frame, a hopper mounted lengthwise of the frame and formed with a recess circular in cross-section, in its bottom having a seed-discharge opening at one end, a seed-spout into which the said opening leads, a seed-feeding screw in the recess in the bottom of the hopper, a shaft extending frontward from the screw, a pinion on the shaft, a furrow-wheel having a circular gear on its face to engage the said pinion, an eccentric on the shaft, a strap on the eccentric having an arm, a frame pivotally mounted in the hopper and connected to arm of the eccentric-strap, and agitator-fingers secured to the frame in the hopper, substantially as described.

In testimony whereof I affix my signature in presence of two witnesses.

SQUIRE TIMOTHY McKNIGHT.

Witnesses:
R. J. RAMSY,
T. D. MELTON.